J. PAUPA & G. F. HOCHRIEM.
COIN CONTROLLED VENDING MACHINE.
APPLICATION FILED MAR. 8, 1916.

1,275,731.

Patented Aug. 13, 1918.
8 SHEETS—SHEET 2.

Witness:
Leo. D. Mais.

Inventors.
Joseph Paupa
Gustav F. Hochriem
By Robt. Klotz Atty.

J. PAUPA & G. F. HOCHRIEM.
COIN CONTROLLED VENDING MACHINE.
APPLICATION FILED MAR. 8, 1916.
1,275,731.
Patented Aug. 13, 1918.
8 SHEETS—SHEET 3.
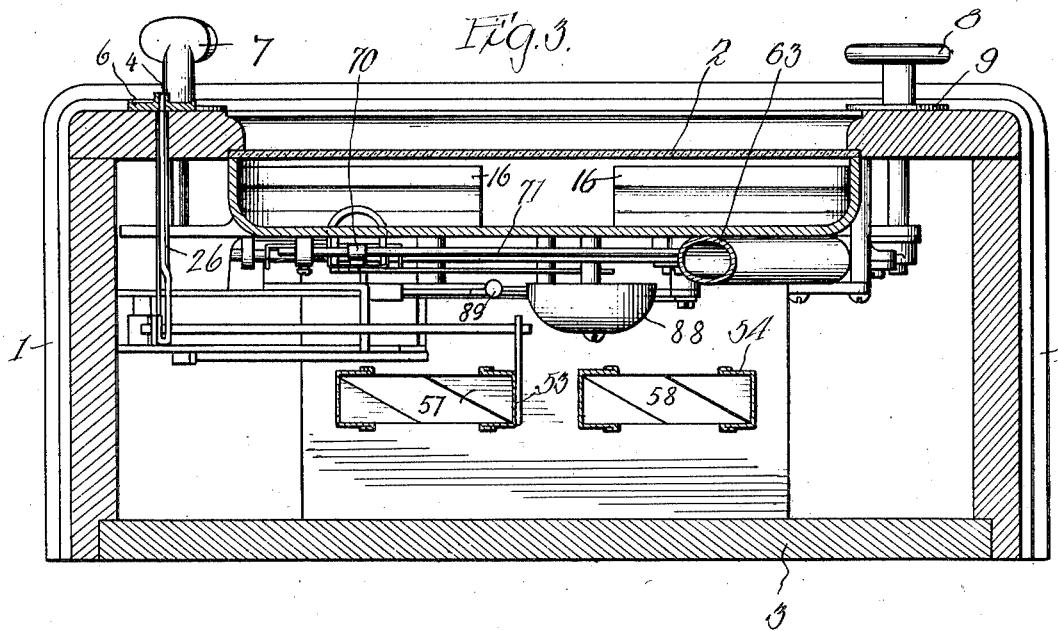
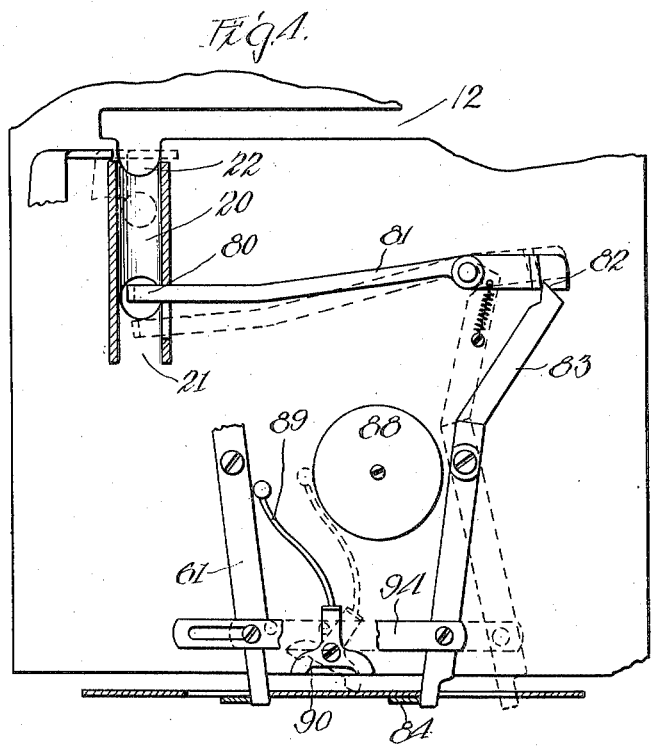

J. PAUPA & G. F. HOCHRIEM.
COIN CONTROLLED VENDING MACHINE.
APPLICATION FILED MAR. 8, 1916.
1,275,731.
Patented Aug. 13, 1918.
8 SHEETS—SHEET 4.
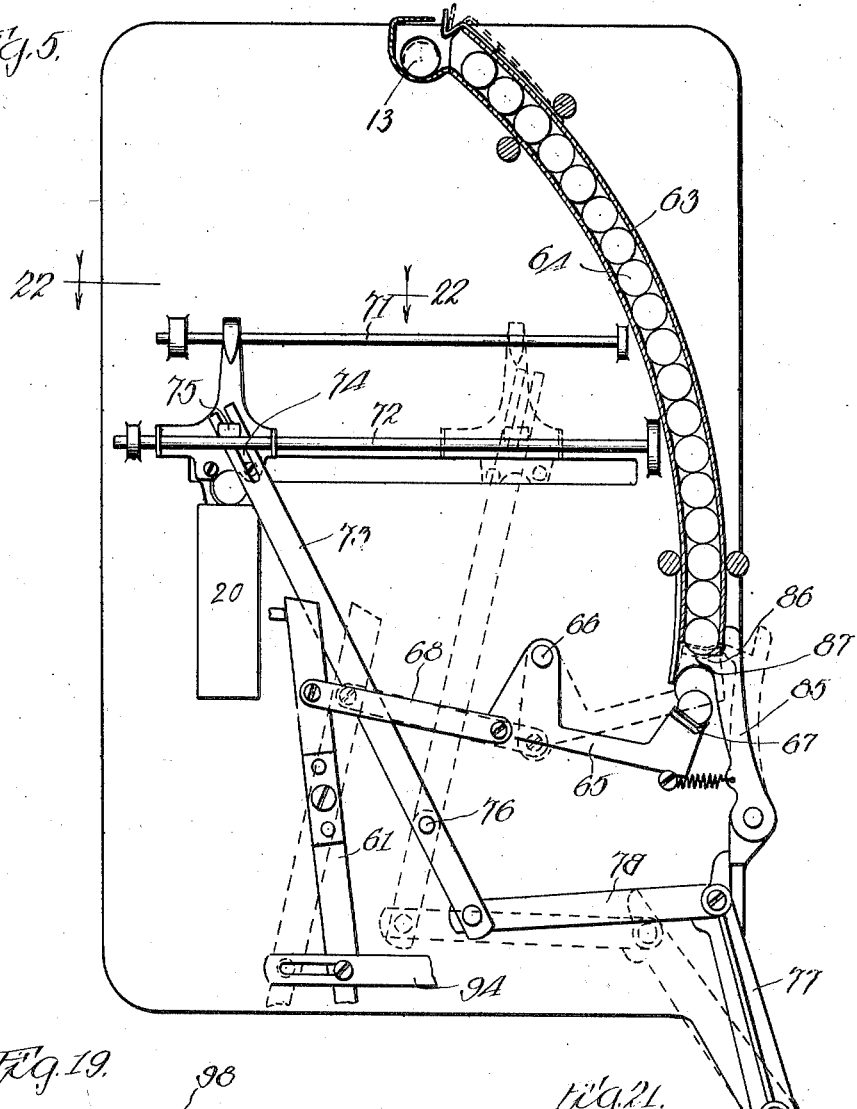
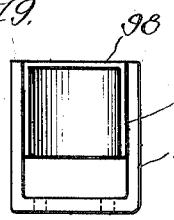
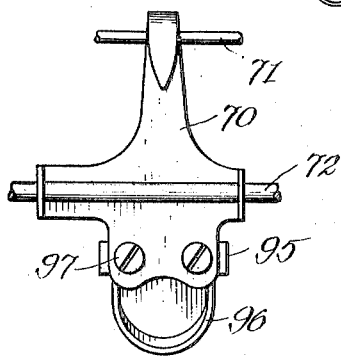
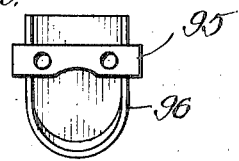
Witness:
Leo. DuMais.
Inventors
Joseph Paupa
Gustav F. Hochriem
by Robt. Klotz, Atty

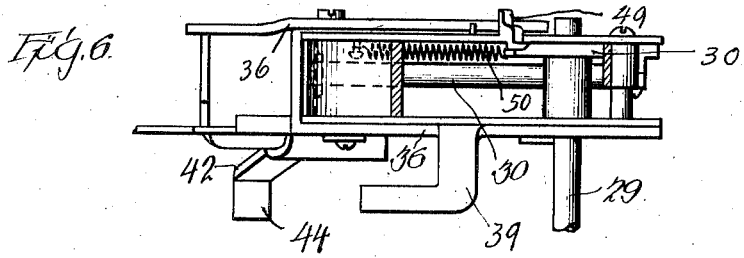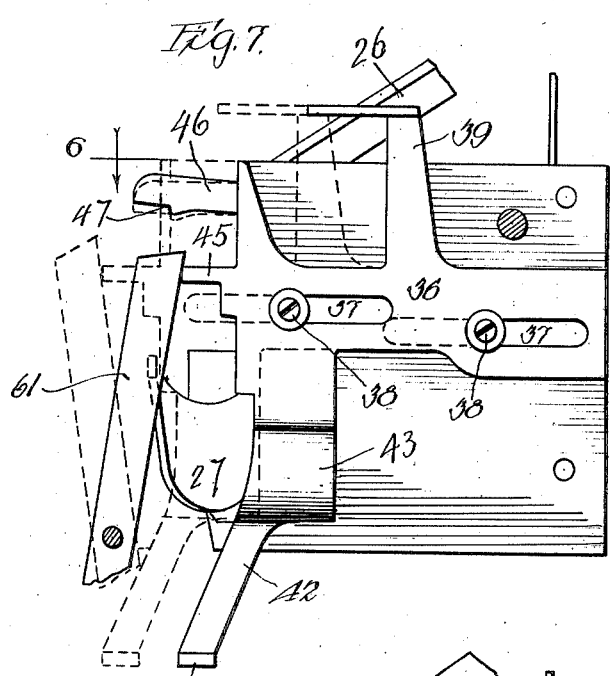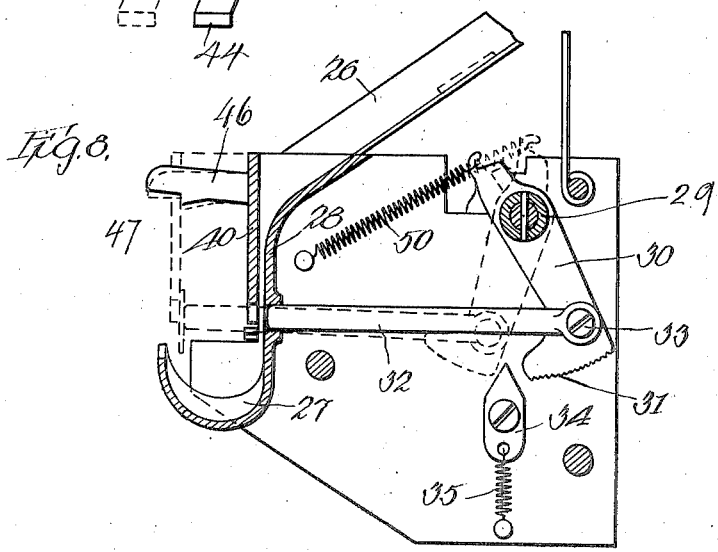

J. PAUPA & G. F. HOCHRIEM.
COIN CONTROLLED VENDING MACHINE.
APPLICATION FILED MAR. 8, 1916.
1,275,731.
Patented Aug. 13, 1918.
8 SHEETS—SHEET 6.
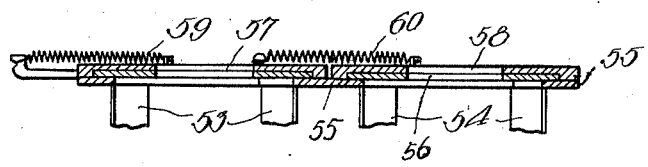
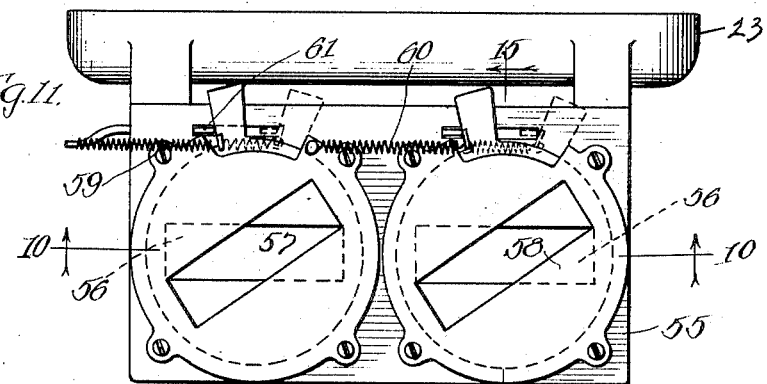
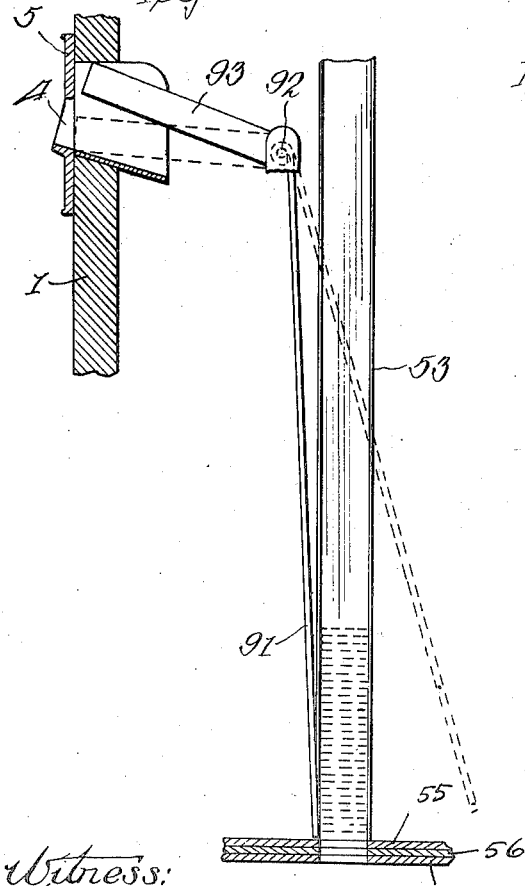
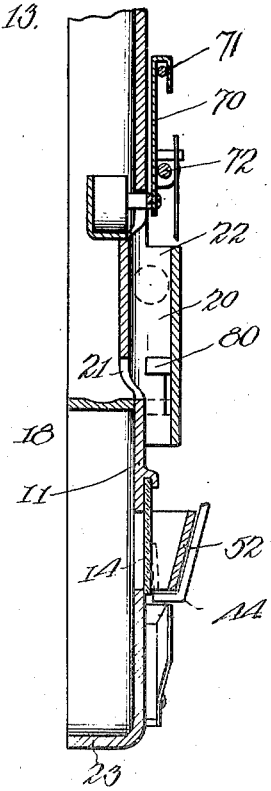
Witness:
Inventors:
Joseph Paupa
Gustav F. Hochriem
By Robt. Klotz Atty.

J. PAUPA & G. F. HOCHRIEM.
COIN CONTROLLED VENDING MACHINE.
APPLICATION FILED MAR. 8, 1916.
1,275,731.
Patented Aug. 13, 1918.
8 SHEETS—SHEET 7.
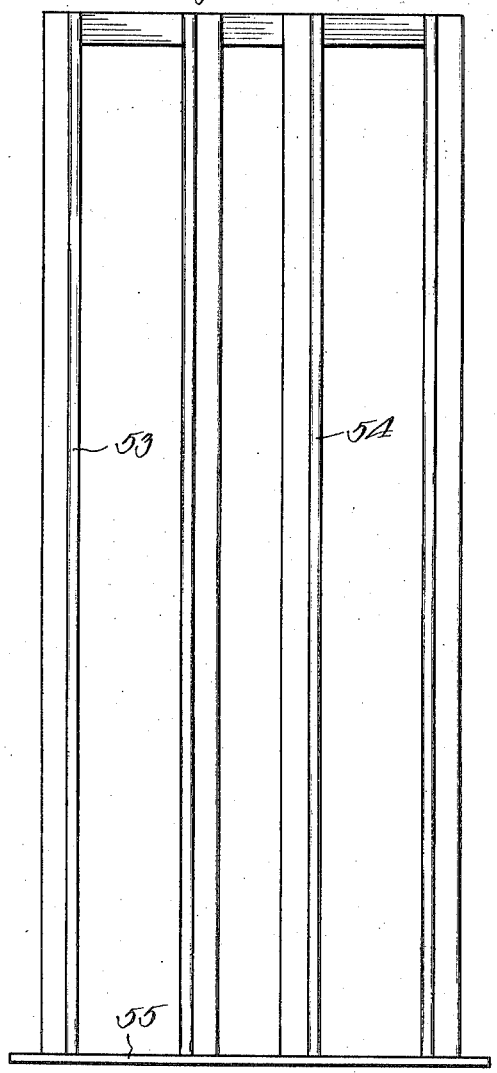
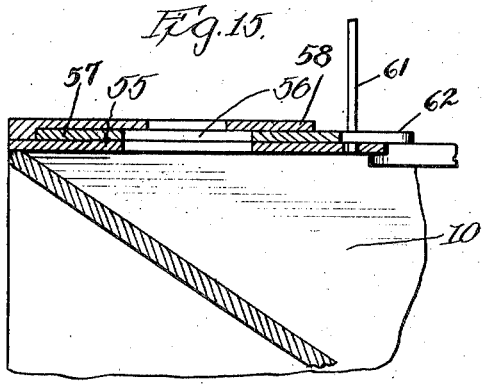
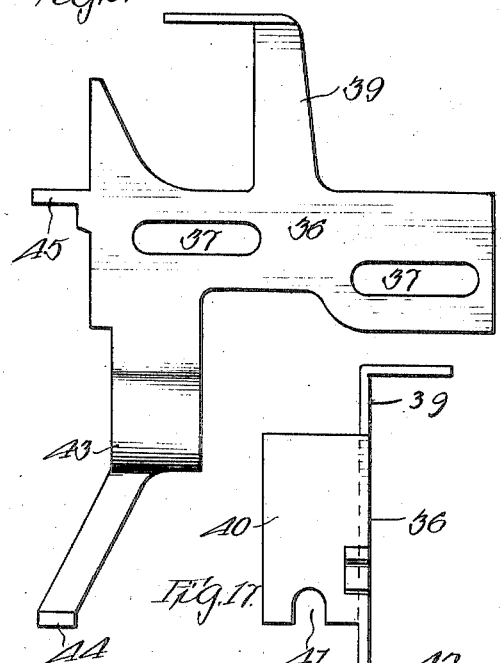
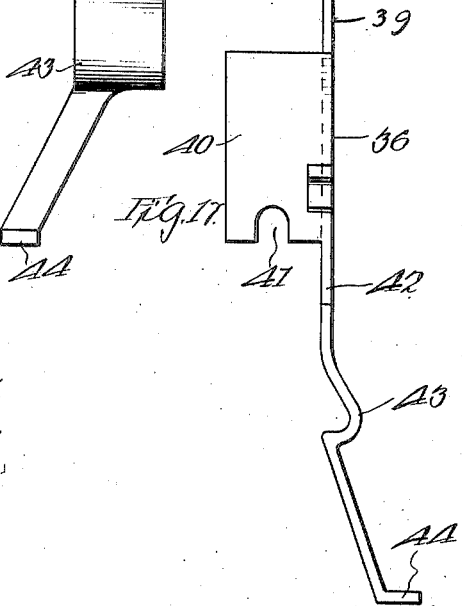
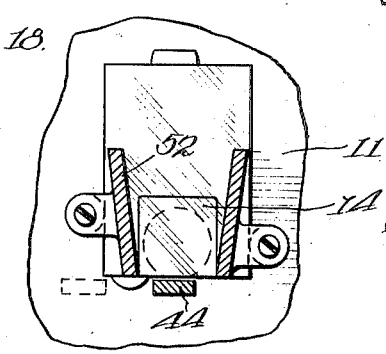
Witness:
Leo D. Mais
Inventors
Joseph Paupa
Gustav F. Hochriem J. PAUPA & G. F. HOCHRIEM.
COIN CONTROLLED VENDING MACHINE.
APPLICATION FILED MAR. 8, 1916.
1,275,731.
Patented Aug. 13, 1918.
8 SHEETS—SHEET 8.
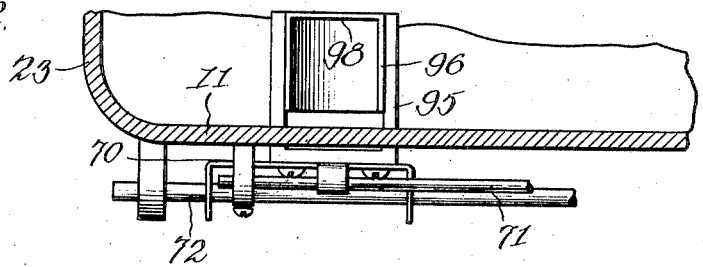
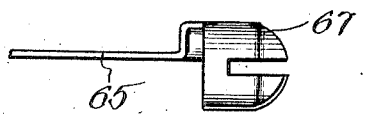
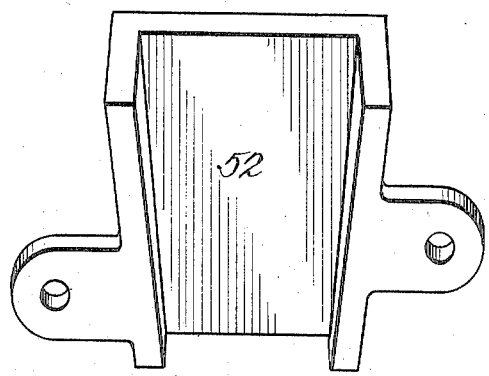
Witness:
Leof. Dufrais.
Inventors
Joseph Paupa
Gustav F. Hochriem
By Robt. Klotz, Atty.

UNITED STATES PATENT OFFICE.

JOSEPH PAUPA AND GUSTAV F. HOCHRIEM, OF CHICAGO, ILLINOIS.

COIN-CONTROLLED VENDING-MACHINE.

1,275,731.   Specification of Letters Patent.   Patented Aug. 13, 1918.

Application filed March 8, 1916. Serial No. 82,927.

*To all whom it may concern:*

Be it known that I, JOSEPH PAUPA and GUSTAV F. HOCHRIEM, citizens of the United States, residing at Chicago, in the county of Cook and State of Illinois, have invented certain new and useful Improvements in Coin-Controlled Vending-Machines, of which the following is a specification.

Our invention relates to a coin controlled vending machine and more particularly to an improved type of machine of that class by which an extra sample in addition to the article supplied to the purchaser is delivered gratis under certain circumstances.

Besides the usual coin controlled vending mechanism we incorporate in our improved machine, another article delivery mechanism which under certain circumstances within the control of the purchaser or the operator of the machine may deliver a free sample in addition to the article supplied for the coin deposited.

In the embodiment or adaptation of our improved machine hereinafter described, we have arranged an automatic article delivery mechanism which is manually set by the purchaser at the time he deposits his purchase price and then through skilful and correct manipulation of a certain mechanism by said purchaser, is automatically operated to deliver a free sample from the machine in addition to the article delivered for the purchase price.

The principal objects of our improved machine are to attract customers, to increase the selling capacity, to introduce new and different styles or kinds of salable articles, and to supply a sample gratis under certain circumstances.

These and other objects we accomplish as fully set forth in the following description and pointed out in the appended claims, reference being had to the accompanying drawings in which an embodiment of our improved machine especially adapted for vending chewing gum is shown.

In the drawings—

Fig. 3, is a horizontal section taken through the machine on line 3—3 Fig. 2.

Fig. 4, is an enlarged fragmentary view to show the operation of the free sample delivering mechanism.

Fig. 5 is a fragmentary view to illustrate the operation of the ball catching cup, the ball tube, and its operating levers and stops.

Figs. 6, 7, 8 and 9, are enlarged detail views of the coin slot mechanism.

Fig. 10, is a fragmentary vertical section through the merchandise chutes and their supporting base on line 10—10 Fig. 11.

Fig. 11 is a detached bottom plan of the base for the merchandise chutes and ejector mechanism.

Fig. 12, is a fragmentary view partially in section to illustrate the stop mechanism for closing the slot when the merchandise chute is empty.

Fig. 13, is an enlarged fragmentary section on line 13—13, Fig. 1.

Fig. 14, is a detached side elevation of the merchandise chutes and their supporting base.

Fig. 15, is an enlarged fragmentary section through the base on line 15—15 Fig. 11.

Figs. 16 and 17 are enlarged details of the angular slide plate.

Fig. 18, is an enlarged fragment partially to show the coin view window and the coin pocket.

Figs. 19, 20 and 21 are detail views of the ball catching cup and its supporting slide block.

Fig. 22 is a fragmentary enlarged section through the supporting plate on line 22—22, Fig. 5, to illustrate the slide block and ball catching cup in top plan.

Fig. 23 is a top plan view of the ball lifting lever to show the ball holding cupped end.

Fig. 24, is a section through the ball holding cupped end of the lifting lever to illustrate its hollowed out construction.

Fig. 25 is a detached perspective view of the coin holding pocket.

In referring to the embodiment of our improved machine shown in the accompanying drawings in detail, like numerals designate corresponding parts.

The embodiment of our improved vending machine as illustrated in the accompanying drawings is primarily intended for the distribution of chewing gum although it may with but slight alterations and modifications be adapted for vending numerous other salable articles and merchandise.

Figure 1:
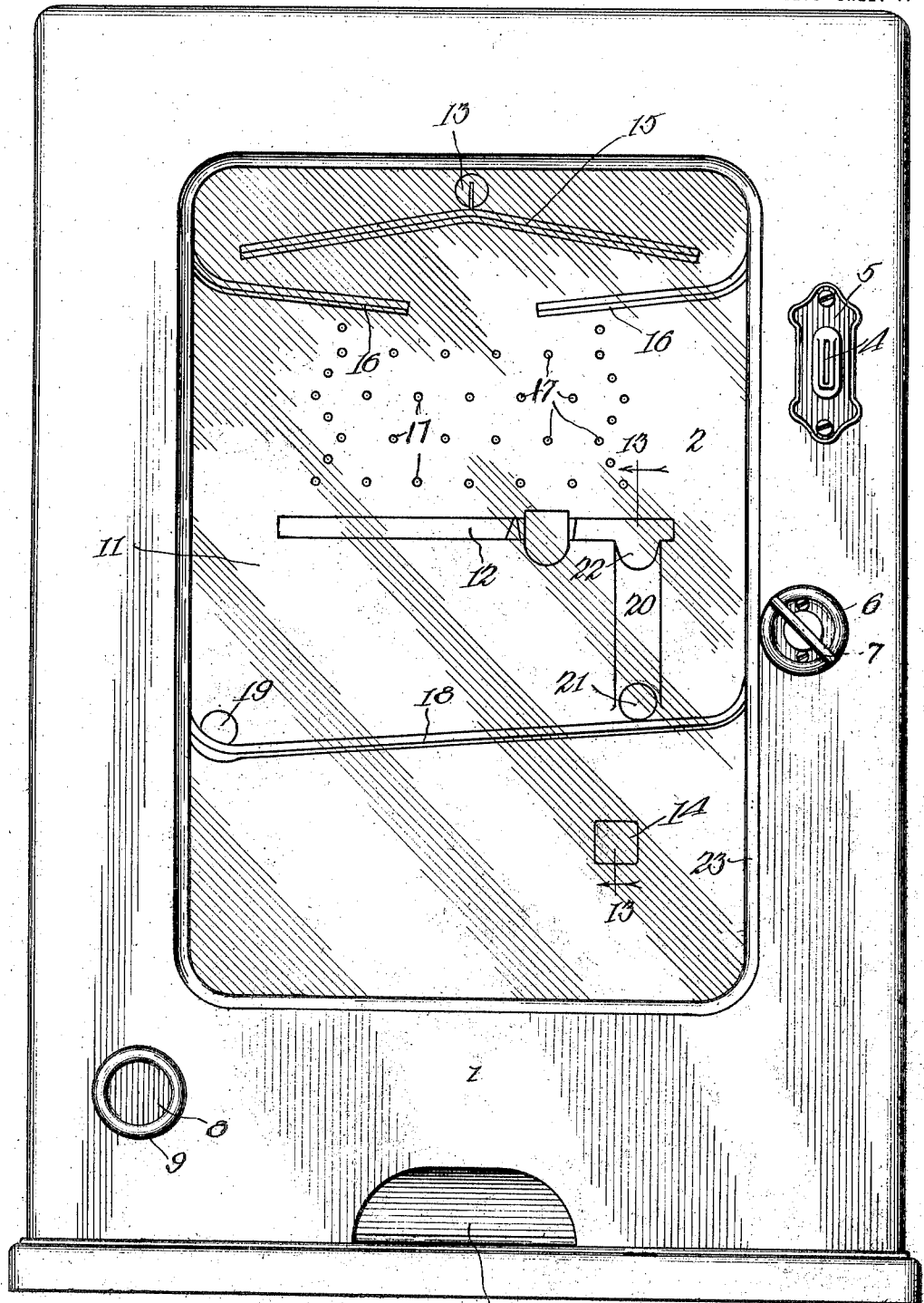
Figure 1, represents a front elevation of our improved vending machine.
Figure 2:
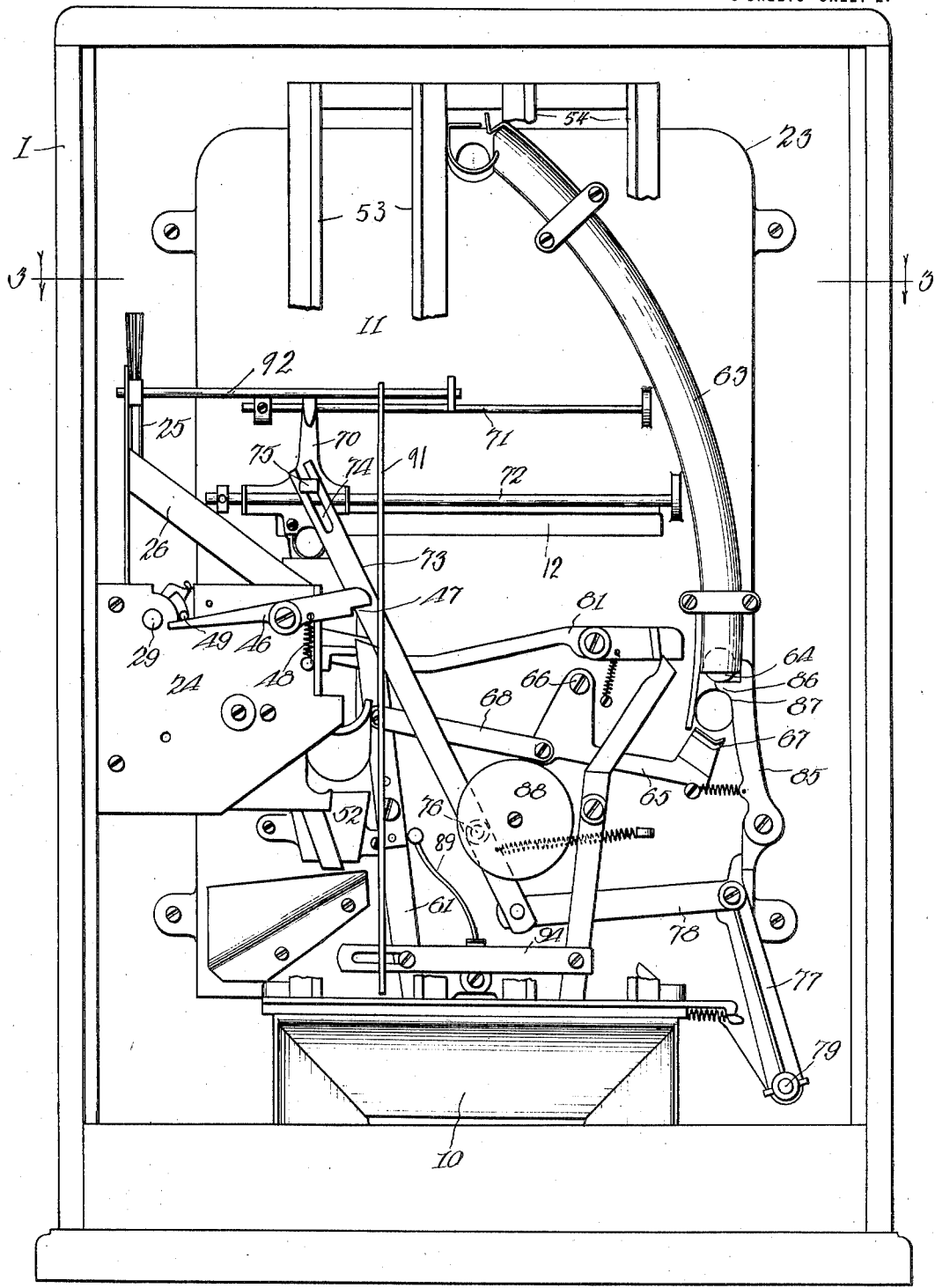
Fig. 2, is a rear elevation of the vending machine with the rear door removed to expose the interior mechanism.

As shown in Figs. 1, 2 and 3, the mechanism is inclosed within an upright box or case 1, constructed in any desired manner and having a large front window 2, of glass or the like and a large rear door 3, which is removable to permit access to the interior of the box.

In the front of the box at one side of the window 2, we have located a coin receiving slot 4, formed in a metal plate 5.

Below the slotted plate and on the same side of the box frame we mount a tubular socket 6, from which projects a rotatable winged button.

On the opposite side of the window 2 and near the lower end of the box is mounted a socket 9 from which projects a rotatable handle or knob 8.

The opening 10 through which the gum or other commodity is ejected from the box is located in the lower portion thereof and beneath the window 2.

Within the box we arrange a vertical supporting plate 11, which is substantially rectangular in shape.

This plate forms a support for the mechanism and is provided midway of its length with a substantially horizontal slot 12. A circular opening 13 is arranged in the center of the upper portion of the plate and near the lower right hand corner is positioned a view window 14, through which the coin is displayed.

A series of runways are also arranged on the front of the plate 11, just below the center opening 13, which comprise an upper runway 15 having its highest point centrally located and vertically beneath the opening 13, with its side portions extending oppositely from said highest point on a slight downward slant terminating a short distance from the sides of the box frame. Two lower runways 16, extend inwardly toward each other at a slight downward slant from the sides of the frame and terminate at a sufficient distance from each other to leave a fairly wide central space between their inner ends.

Below the lower runway a series of pins 17, are placed in separated arrangement and extend horizontally or laterally out from the supporting plate 11.

These pins are arranged substantially as shown in Fig. 1, and are located between the lower runways 16, and the slot 12.

Below the slot 12, and between said slot and the coin view window 14, we arrange a runway 18, which extends completely across the plate 11, from side to side thereof and on a slight downward slant from the right to the left.

In the left side of the plate 11, we form an opening 19, which is located at the lower termination of the runway 18, and at a short distance inwardly from its upturned end. A vertical outwardly extending rib or channel 20, is formed in the plate extending from the slot 12, to the runway 18, a circular opening 21 extending through the plate at the lower termination of the rib just above the runway 18, and an upper circular opening 22, being also formed in the plate at the upper end of the depression just below the horizontal slot.

The rectangular supporting plate is also provided with an outwardly extending surrounding marginal flange or offset 23, which extends toward the front of the box at approximately a right angle to the body of the said plate and closes the sides, top and bottom of the space between the window and plate.

The mechanism with the exception of the chutes for the articles of merchandise and the ejecting means is distributed upon and supported from the rear side of the supporting plate.

We will now describe the various operating mechanisms of our improved machine, taking them up in the proper order of their sequence in operation.

On the rear side of the plate in proximity to the slot 4, is attached a frame 24, of hollow rectangular form, similar to the frame of a door lock, and above said frame an inclined slotted guideway 25, extends to the inner end of and registers with the coin slot 4.

From the inner lower end of the guideway 25, an inclined coin chute 26 extends to the upper right hand corner of the frame which discharges the coin over the corner of the frame, vertically down to an outwardly inclined channeled portion 27, of a vertical member 28, fastened to the side edge of the frame.

A rock shaft 29, is journaled in the frame which extends horizontally out through the box and has its outer extremity secured to the winged button 7.

A segmental block 30, is mounted on the inner end of the shaft 29, within the hollow frame which in fact serves as a crank and has a curved serrated outer edge 31, and a horizontal bar 32, which is slidably mounted in the frame, has its inner end pivoted to a pivot pin 33, on the side of the block and its outer end projecting through an opening in the vertical frame member 28.

A small locking door 34, is pivoted in the frame below the segmental block and is arranged to engage the serrations of said block and lock it against return movement when the range of movement of the segmental block is shortened.

The dog is maintained in its operating position by a spring 35.

An angular plate is slidably mounted on the front face or side of the hollow frame 24, and is preferably formed in a single casting and substantially as shown in Figs. 16 and 17.

The body 36, of this plate is provided with two horizontal slots 37 through which pins 38 slidably project to adjustably secure the plate to the hollow frame.

From about midway of the body 36, an angular arm 39, extends horizontally frontward, then bends and extends vertically upward and finally bends and extends horizontally to the right. The purpose of this angular arm 39, will be explained further on.

A portion 40 which extends rearwardly at a right angle from the front or right hand end of the body, projects over the edge of the hollow frame and is provided with a slot 41, for the passage therethrough of the horizontal bar 32, when a coin is not interposed between.

An angular arm 42, depends from the front or right hand end of the body and has an intermediate curved or recessed portion 43, which serves as a coin stop when the plate is in its extended position and an obliquely depending portion provided with an outwardly bent horizontal lower extremity that forms a stop 44, for a coin in the rear of the view window.

The angular plate is also provided with a horizontal lug 45 at its right hand end.

A locking lever 46, is pivoted to the rear side of the hollow frame and has a notch 47, in its outer end, the shoulder of which engages over a shoulder on the portion 40, and locks the plate in its extended position.

The lever is normally maintained in its locking position by a spring 48, and is lifted out of its locking position by a lateral projection 49 which extends rearwardly from the segmental block 30 and projects over the opposite portion of the said lever.

The segmental block is normally maintained in a retracted position by a spring 50, shown in Fig. 8.

The vertical member 28 is provided with a short lateral lug or projection 51, which acts to catch, stop and hold a coin descending from the inclined chute portion 27.

A coin pocket, 52 is arranged on the supporting plate in the rear of the coin viewing window 14, and has an open bottom which is closed by the stop 44, when the angular plate is in its extended position as shown in Fig. 18.

To the right of the hollow frame and the slot mechanism, viewing the machine from the rear, are arranged the various levers and connecting rods controlling the commodity ejecting mechanism.

The merchandise is preferably arranged in two vertical chutes 53 and 54 which extend upward side by side from a base 55, see Fig. 14, and said base is provided with two slots 56, each arranged below one of the chutes.

The articles are positively ejected from the lower ends of the chutes by two independent plates 57 and 58 each of which is separately and pivotally mounted beneath the base so as to partially rotate or turn and is provided with a slot which when the plate is in one position registers with the slot in the base so that the lowermost article in the chute drops into said slot in the plate and is ejected therefrom by the abrupt turning of said plate when it is released.

Springs 59 and 60, are connected respectively to each of the plates and serve to return them to their normal position with their slots registering with the companion slots in the base.

It will be noted by referring to Fig. 3, that the slots in the base while directly beneath the chutes are disposed obliquely or at an angle thereto so that the article when dropped into the slot in the plate is kicked diagonally forward and out through the opening 10.

These plates will hereinafter be termed the merchandise ejecting plates, and one of them, plate 57, is turned on its pivot to permit the lowermost article in the chute 53 to drop into its slot by a rock lever 61, the upper end of which is engaged by the lug 45, of the angular plate and is moved toward the right viewing the machine from the rear, as shown in Fig. 2, by the movement of the angular slide plate to its extended position.

The lower end of the lever 61, projects over an extension 62, of the plate 57 and turns the plate against the tension of its spring 59 into position to receive the lowermost article in its slot.

The plate 57, together with the other necessary elements constitutes the means for supplying an article of merchandise for each and every coin deposited in the machine.

In addition to this mechanism we have provided an extra chute and an independent ejecting mechanism for the merchandise in said chute which is operated by certain novel mechanism and under certain novel circumstances.

A curved tube 63, is attached to the rear side of the supporting plate in nearly a vertical position with its lower end just above the opening 19, and its upper end extending to and in the rear of the top opening 13.

This tube is filled with metal balls 64, and an angular lever 65 pivoted at one end to the plate by a pivot 66, has its opposite end 67, cupped to hold a ball and adapted to receive a ball from the opening 19, as it passes through the same from the lower end of the runway 18, and push it into the tube 63, thereby forcing the top ball in the tube out through the top opening 13.

The angular lever 65, is rocked to elevate the ball by the movement of the lever 61, operating the ejecting plate 57, through a connecting rod 68, as shown in Fig. 2.

The top ball as it rolls forward through the opening 13 runs upon the runway 15, turns to one side or the other, traverses to the outer end and drops down upon the runway 16 beneath. It now runs immediately, rolls off the inner end of the runway and drops upon the pins 7, or some of the pins which serve to deflect it in various directions.

A ball catching cup projects in front of the horizontal slot 12, being slidably supported in place by a forward extending slide 69, which projects through the slot 12, and is secured at its rear end to a slide block 70, slidably mounted on two parallel horizontal supporting rods 71 and 72.

The slide block 70 is moved on said rods by a lever 73, the upper end of which is slotted at 74 to receive a pin 75, projecting from the slide block.

The lever 73, is pivoted to the supporting plate at 76 and its lower extremity is operatively connected to a crank 77, by a connecting rod 78.

The shaft 79, upon which the crank 77 is mounted carries the knob 8 at its front end.

It will thus be seen that the operator can by grasping the knob 8 and turning it shift the ball catching cup laterally across the front face of the supporting plate and the dropping path of the ball and if said cup be moved accurately enough to place it vertically beneath the ball it will catch the same as it drops from the pins.

If the ball be caught in the cup it will be carried in said cup on its return to its normal position and will drop out of said cup through the opening 22 and downward through the depression or recess 20, impinging upon the end 80 of a horizontal locking lever 81, shown in Fig. 4, and thereby depressing said lever end and elevating its opposite end which is provided with a notch 82, and releasing a vertical lever 83, the upper sharpened end of which normally engages in the notch 82, and the lower extremity of which projects in front of a lateral projection 84, on the slotted ejecting plate 58.

The release of the vertical lever permits the plate 58 to be abruptly rocked by its spring and to eject a free sample of merchandise from the chute 54.

The ball then continues on its downward course through the vertical recess 20, passing out of the same upon the runway 18 and rolling down to the opening 19, through which it passes to drop into the cup 67, at the end of the lever 65, as said lever is lowered to receive the same.

The balls in the tube are prevented from rolling downward as the lever 65 is depressed by a spring pressed pivotal stop 85, which has a lateral lug 86, that normally projects in the path of the balls provided with a slanting side surface 87, upon which the lowermost ball is rolled, forcing the stop outwardly as it is pressed upward by the lever 65.

Should the operator fail to catch the ball in the cup, it drops downward upon the runway 18, and rolls to and through the opening into the cup end 67, of the lever 65 as previously described.

We have, in order to attract attention and indicate when a free sample is being awarded as above described, placed a bell or gong 88, upon the supporting plate which is sounded by being struck by the striker, 89, said striker being operated by a lug 90, which forces the striker toward the ball, as shown in Fig. 4.

To prevent coins being deposited after the merchandise chute is empty, a stop mechanism is provided which is constructed substantially as shown in Fig. 12.

In this portion of our invention a wire 91, is attached at its upper end to a horizontal rock shaft 92, and extends downwardly in the front of the merchandise in the chute, and a stop bar 93, also extends from said rock shaft and normally projects in an oblique position slightly inclined upwardly from the horizontal over the passageway for the coin through the slot.

When the merchandise chute is empty, the weight of the stop bar 93, causes it to drop from the position shown in full lines in Fig. 12 to the position shown in dotted lines in said Fig. 12, and to obstruct the passage through the slot thereby preventing the introduction of a coin.

The free sample ejecting mechanism is so arranged that after it has ejected a sample it has to be reset by the next purchaser turning the winged button which rocks the lever 61 and through a connecting rod 94, returns the vertical lever 83 to a locked position with regard to the lever 81.

This is accomplished before the ball has dropped below the ball catching cup so that the machine is in readiness to deliver a free sample should the purchaser catch the ball in the cup.

In Figs. 19, 20 and 21 we have shown a preferable form of our ball catching cup which consists of a U-shaped horizontal member 95, and a U-shaped vertical member 96, connected together as shown to leave both the top and the rear side of the cup open for the passage of the ball.

The cup is fastened to the slide block by screws 97, as shown in Fig. 21 and the front side is closed by a partition or wall 98.

The operation of our improved machine is substantially as follows:—

A coin being introduced into the slot 4 and the merchandise chute being at least partially filled with articles of merchandise, it slides through the slots until caught by the stop lug 53.

The coin is now in position between the portion 40 and the edge of the hollow frame and in front of the slot 41, to prevent the passage therethrough of the horizontal bar 32.

The winged button 7 now being turned by the operator the shaft 29 is rocked, the segmental block 30, given a partial rotation and the bar 32, is moved horizontally outward catching the coin between its outer end and the portion 40.

The bar 32, coin, and the angular plate are now moved outwardly in unison, the coin being held in place between the bar end and the portion 40 by friction and the lever 61 is rocked by the lug 45 of the angular plate to operate the ejecting plate 57, and eject an article of merchandise.

When the bar 32, is retracted, the coin is released and drops in the curved portion 43 of the depending arm of the angular plate to be held there until the angular plate is moved back when it is dropped into the pocket behind the coin viewing window, being held there by the return of the angular plate to its extended position and the projecting of the stop 44, across the open bottom of the pocket.

When the angular plate is again moved to free the open bottom of the pocket, the coin drops finally into a convenient receptacle in the bottom of the inclosing case or box.

The movement of the angular slide plate not only ejects an article of merchandise from the chute 53, but it also elevates the cupped end of the ball raising lever, forcing a ball into the lower end of the tube and expelling the top ball from the top end of the tube as previously described.

This ball then descends in the front of the machine between the large front window and the vertical supporting plate and is either caught in the ball catching cup or escapes being caught.

Should the operator catch the ball in the cup, a free sample of merchandise is automatically delivered from the other chute 54, in the manner heretofore described.

Our present improved machine not only delivers a proper value in merchandise for every coin deposited in it but also when the ball is caught presents the customer with an extra article gratis as an advertising feature.

The great advantage of the machine is that each and every customer must receive full value for each coin introduced into the machine and also in addition may obtain an extra free sample.

It requires considerable skill, quickness of perception and accuracy of eye sight to properly slide the ball catching cup to intercept the ball as it descends, and the machine in fact serves admirably to train the eye.

While we have illustrated and described a preferred form of construction for carrying our invention into effect, the same is capable of a wide range of variation, alteration, modification and change without departing from the spirit of the invention, we therefore do not wish to be limited to the embodiment above described, but desire to avail ourselves of all such variations, alterations, modifications and changes as fairly fall within the scope of the appended claims or may be construed to be within the same by involving the doctrine of equivalents.

What we claim as our invention and desire to secure by Letters Patent is:—

1. In a machine of the class described, the combination with a coin controlled vending mechanism, of an additional ball released free sample supplying mechanism, a ball catching mechanism, manually operated means for accurately positioning said ball catching mechanism, and elements constituting a runway for leading a caught ball to said ball released mechanism.

2. In a machine of the class described, the combination with a coin controlled vending mechanism, of an additional free sample supplying mechanism, a ball supplying mechanism, a laterally slidable cup adapted to be manipulated to catch the ball as it drops, ball released ejecting mechanism for said free sample supplying mechanism, and elements constituting a runway for leading a caught ball to said ball released ejecting mechanism.

3. In a machine of the class described, the combination with a coin controlled vending mechanism, of an additional free sample supplying mechanism, a ball supplying mechanism, a laterally slidable cup adapted to be manipulated to catch the ball as it drops, manually operated means for sliding said cup, ball released ejecting mechanism for said free sample supplying mechanism, and elements constituting a runway for leading a caught ball to said ball released ejecting mechanism.

4. In a machine of the class described, an upright inclosing case having a front window and a removable rear door, a vertical supporting plate in the rear of the front window, operating mechanism arranged upon the rear of said plate, ball deflecting elements arranged upon the front of said plate, means for dropping a ball down upon the deflecting elements, a ball catching cup arranged beneath the ball deflecting elements, said cup being slidable across the face of the plate, merchandise chutes arranged upon a base, ejecting mechanism in said base, coin controlled mechanism for operating one of said ejecting mechanisms and means whereby the other ejecting mechanism is adapted to be released by a ball caught in the cup.

5. In a machine of the class described, the combination with a suitable supporting and inclosing case and coin controlled vending mechanism in said case, of a ball incasing tube, a plurality of balls filling said tube, means for elevating said balls, in said tube, a device for catching a ball as it is dropped from the upper end of said tube and a free sample supplying mechanism released by a caught ball.

6. In a machine of the class described, the combination with a suitable supporting and inclosing case and coin controlled vending mechanism in said case, of a curved nearly vertically disposed ball incasing tube, a plurality of balls filling said tube, means for elevating said balls, in said tube, a device for catching a ball as it is dropped from the upper end of said tube and a free sample supplying mechanism released by a caught ball.

7. In a machine of the class described, the combination with a suitable supporting and inclosing case and coin controlled vending mechanism in said case, of a ball incasing tube, a plurality of balls filling said tube, a lever having a cupped end for elevating said balls in said tube, a device for catching a ball as it is dropped from the upper end of said tube and a free sample supplying mechanism released by a caught ball.

8. In a machine of the class described, the combination with a suitable supporting and inclosing case and coin controlled vending mechanism in said case of a ball incasing tube, a plurality of balls filling said tube, means for elevating said balls in said tube, a horizontal slidable cup for catching a ball as it is dropped from the upper end of said tube and a free sample supplying device released by a caught ball.

9. In a machine of the class described, the combination with a suitable supporting and inclosing case, of a coin controlled vending mechanism in said case, a ball incasing tube, a plurality of balls filling said tube, means for elevating said balls in said tube, a device for catching a ball as it is dropped from the upper end of said tube, a plurality of independent merchandise chutes, an ejecting mechanism for one of said chutes released for operation upon the dropping of a coin, an independent ball operated ejecting mechanism for another chute, a ball catching mechanism, and elements constituting a ball runway from said ball catching mechanism to said ball operated ejecting mechanism.

10. In a machine of the class described, the combination with a suitable supporting and inclosing case, of a coil controlled vending mechanism in said case, a ball incasing tube, a plurality of balls filling said tube, means for elevating the balls in said tube, a device for catching a ball as it is dropped from the upper end of said tube, a plurality of independent merchandise chutes, an ejecting mechanism for one of said chutes operable upon the dropping of a coin, an independent ejecting mechanism for another chute, a ball operated tripping lever for said independent ejecting mechanism, a ball catching mechanism, and elements constituting a ball runway from said ball catching mechanism to said tripping lever.

11. In a device of the class described, manually operable vending mechanism, coin controlled mechanism adapted to release the vending mechanism upon the introduction therein of a coin and permit said vending mechanism to be manually operated, an additional free sample ejecting mechanism, a gravity operated element dropped by said coin controlled mechanism, and means whereby said element may be guided to the sample ejecting means to release the same.

12. In a device of the class described, manually operable vending mechanism, coin controlled mechanism to release the vending mechanism upon the introduction therein of a coin and permit said vending mechanism to be manually operated, an additional free sample ejecting mechanism, a gravity operated element dropped by said coin controlled mechanism, and means whereby said element may be guided to the sample ejecting mechanism to release the same, after the vending mechanism has been operated.

13. In a vending machine, the combination with a plurality of merchandise supplying mechanisms, of a separate ejecting mechanism for each merchandise supplying mechanism, manually operable actuating means for one of said ejecting mechanisms, a gravity actuated element for releasing the other ejecting mechanism, dropped by said manually operable means, and a movable device formed to receive said element and by manipulation of which the element may be guided to said other ejecting mechanism.

14. In a machine of the class described, a sample supplying mechanism, an ejecting means for said sample supplying mechanism, and a rolling ball mechanism for releasing said ejecting means under certain conditions to deliver a sample, said rolling ball mechanism including a tube filled with balls, a lever for elevating a ball into the lower end of said tube and thereby forcing a ball from the upper end of said tube and a device adapted to be manipulated to catch a ball as it rolls and drops from the upper end of the tube.

15. In a machine of the class described, a sample supplying mechanism, an ejecting means for said sample supplying mechanism, and a rolling ball mechanism for releasing said ejecting means under certain conditions to deliver a sample, said rolling ball mechanism including a tube filled with balls, a lever for elevating a ball into the lower end of said tube and a device adapted to be manipulated to catch a ball as it rolls and drops from the upper end of the tube; said device being laterally adjustable across the path of the dropping ball.

16. In a machine of the class described, a sample supplying mechanism, and ejecting means for said sample supplying mechanism, and a rolling ball mechanism for releasing said ejecting means under certain conditions to deliver a sample, said rolling ball mechanism including a tube filled with balls, a lever for elevating a ball into the lower end of said tube and a device adapted to be manipulated to catch a ball as it rolls and drops from the upper end of the tube, said device being laterally adjustable across the path of the dropping ball, and ball deflecting devices arranged between the upper end of the tube and the ball catching device.

17. In a machine of the class described, a sample supplying mechanism, an ejecting means for said sample supplying mechanism, and a rolling ball mechanism for releasing said ejecting means under certain conditions to deliver a sample, said rolling ball mechanism including a tube filled with balls, a lever for elevating a ball into the lower end of said tube and thereby forcing a ball from the upper end of said tube, a spring pressed pivoted stop for holding the ball in the tube against downward movement as the elevating lever is depressed, and a device adapted to be manipulated to catch a ball as it rolls and drops from the upper end of the tube.

18. In a machine of the class described, an upright inclosing case having a front window and a removable rear door, a vertical supporting plate in the rear of the front window, operating mechanism arranged upon the rear of said plate, sloping ball ways arranged upon the front of said plate near the top thereof, coin operated merchandise ejecting mechanism comprising means for dropping a ball upon the ways, a ball catching cup arranged beneath the ball ways, said cup being slidable across the face of the plate, and vending mechanism adapted to be released by a ball caught in the cup.

19. In a machine of the class described, an upright inclosing case having a front window and a removable rear door, a vertical supporting plate in the rear of the front window, operating mechanism arranged upon the rear of said plate, sloping ball ways arranged upon the front of said plate, coin operated merchandise ejecting mechanism comprising means for dropping a ball upon the sloping ways, a ball catching cup arranged beneath the ball ways, said cup being slidable across the face of the plate, a base, ball released ejecting mechanism in said base, and means whereby a caught ball is guided to said ball released ejecting mechanism.

20. In a machine of the class described the combination of two merchandise chutes, a base plate supporting the chutes, a delivery mechanism for each chute, said mechanism having two extreme positions the one for loading and the other for discharging, coin released means for moving both mechanisms into loading position, springs to return the mechanisms to discharging position, means for latching one of the mechanisms in loading position, and means independent of the coin released means for releasing the latching mechanism.

21. In a machine of the class described, the combination with a coin controlled vending mechanism, of an additional ball released mechanism, a ball catching mechanism, manually operated means for accurately positioning said ball mechanism, and elements constituting a runway for leading a caught ball to said ball catching mechanism.

22. In a machine of the class described, the combination with a coin controlled vending mechanism, of an additional mechanism, a ball actuated trigger for initiating the operation of the additional mechanism, a ball catching mechanism, manually operated means for accurately positioning said ball-catching mechanism, and elements constituting a run-way for leading a caught ball to said ball actuated trigger.

23. In a machine of the class described, the combination with a coin vending mechanism, of an additional signaling, and free sample supplying mechanism, a ball supplying mechanism, a laterally slidable cup adapted to be manipulated to catch the ball as it drops, a ball released ejecting mechanism for said free sample supplying mechanism, and elements constituting a runway for leading a caught ball to said ball released ejecting and signaling mechanism.

24. In a machine of the class described, the combination with a coin controlled vending mechanism, of an additional signaling mechanism, a ball supplying mechanism, a laterally, slidable cup adapted to be manipulated to catch the ball as it drops, ball actuated initiating mechanism for said signaling mechanism, and elements constituting a runway for leading a caught ball to said ball actuated initiating mechanism.

25. In a machine of the class described, the combination with a suitable supporting and inclosing case, of a coin controlled vending mechanism in said case, a ball elevating mechanism, a device for catching a ball as it is discharged from the upper end of the elevator, a plurality of independent merchandise chutes, an ejecting mechanism for one of said chutes released for operation upon the dropping of a coin, an independent ball released ejecting mechanism for another chute, a ball catching mechanism, and elements constituting a ball runway from said ball catching mechanism to said ball released ejecting mechanism.

26. In a machine of the class described, the combination with a suitable supporting and inclosing case, of a coin-controlled vending mechanism in said case, a ball-incasing tube, a plurality of balls filling said tube, means for elevating the balls in said tube, a device for catching a ball as it is dropped from the upper end of said tube, a merchandise chute, an ejecting mechanism for said chute operable upon the dropping of a coin, an independent signaling mechanism, a ball operated tripping lever for said signaling mechanism, a ball catching mechanism, and elements constituting a ball runway from said ball-catching mechanism to said tripping lever.

27. In a machine of the class described, the combination with a suitable supporting and inclosing case, of a coin-controlled vending mechanism in said case, a ball elevator, means for actuating the ball elevator, a device for catching a ball as it is discharged from the upper end of the elevator, a merchandise chute, an ejecting mechanism for said chute operable upon the dropping of a coin, an independent signaling mechanism, a ball operated tripping lever for said signaling mechanism, and elements constituting a ball runway from said ball catching mechanism to said tripping lever.

28. In a machine of the class described, the combination of a suitable supporting and inclosing case; a delivery slide movable into charging and discharging position; yielding means to maintain the slide in discharging position; manually operable means to move the slide to charging position; a latch device to hold it in charging position and means operable by return of the manually operable means to trip the latch.

29. In a machine of the character described, the combination of a suitable supporting and inclosing case; a delivery slide movable into charging and discharging position; yielding means to maintain the slide in discharging position; manually operable means to move the slide to charging position; a latch device to hold it in charging position; an impositive means to move the slide to discharging position when released, to prevent injury to the vended article in case of a jam and means operable by return of the manually operable means to trip the latch.

30. The combination in a coin controlled vending mechanism of a ball incasing tube, a plurality of balls filling said tube, means for elevating said balls in said tube, and coin-released means for actuating said elevating means.

In testimony whereof we affix our signatures.

JOSEPH PAUPA.
GUSTAV F. HOCHRIEM.